United States Patent [19]

Harris

[11] 4,161,715

[45] Jul. 17, 1979

[54] METHOD AND APPARATUS FOR MEASURING THE INTERIOR DIMENSIONS OF A HOLLOW BODY

[75] Inventor: Lawrence A. Harris, Schenectady, N.Y.

[73] Assignee: Electric Power Research Institute, Inc., Palo Alto, Calif.

[21] Appl. No.: 830,210

[22] Filed: Sep. 2, 1977

[51] Int. Cl.$^2$ .................. G01S 1/70; G01F 17/00; G01S 1/72

[52] U.S. Cl. .................. 340/16 R; 73/149; 73/627; 73/643; 340/1 R; 340/12 R

[58] Field of Search .................. 73/149, 627, 643; 340/1 R, 12, 16 R

[56] References Cited

U.S. PATENT DOCUMENTS 2,595,241 5/1952 Goble .................. 340/1 R
3,049,920 8/1962 Allen .................. 73/149 X

FOREIGN PATENT DOCUMENTS 1210017 10/1970 United Kingdom .................. 340/1

OTHER PUBLICATIONS

R. M. White, Generation of Elastic Waves by Transient Surface Heating, Journal of Applied Physics, vol. 34, No. 12, Dec. 1963, pp. 3559-3567.
P. M. Griffen et al., Development and Evaluation of an Ultrasonic Imaging System, G.E. Co., Publ. Report # N01-Hv-5-2966-1, Mar. 31, 1976, pp. 1, 2, 17 & 45.
M. Bruma et al., Quelques Experiences Relatant L'induction D'iondes Acoustiques, etc., Le Journal De Physique, Jun. 26, 1965, pp. 341-344.

Primary Examiner—Richard C. Queisser
Assistant Examiner—John P. Beauchamp
Attorney, Agent, or Firm—Flehr, Hohbach, Test, Albritton & Herbert

[57] ABSTRACT

An apparatus for measuring the interior dimensions of the walls of a hollow body. The apparatus is insertable into a restricted opening of the hollow body and includes means for transmitting a beam of electromagnetic energy toward an interior wall of the hollow body. When the electromagnetic energy illuminates the interior wall, acoustic waves are radiated back to the apparatus. The apparatus detects the acoustic waves and measures the elapsed time between transmission of the electromagnetic energy and detection of the acoustic waves. From elapsed time measurements the dimensions of the interior walls are obtained.

15 Claims, 7 Drawing Figures

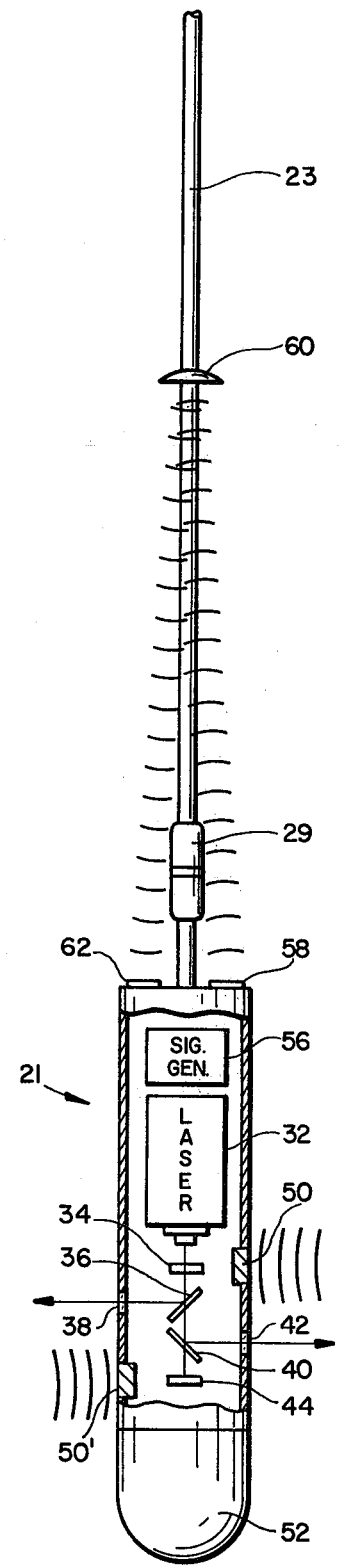
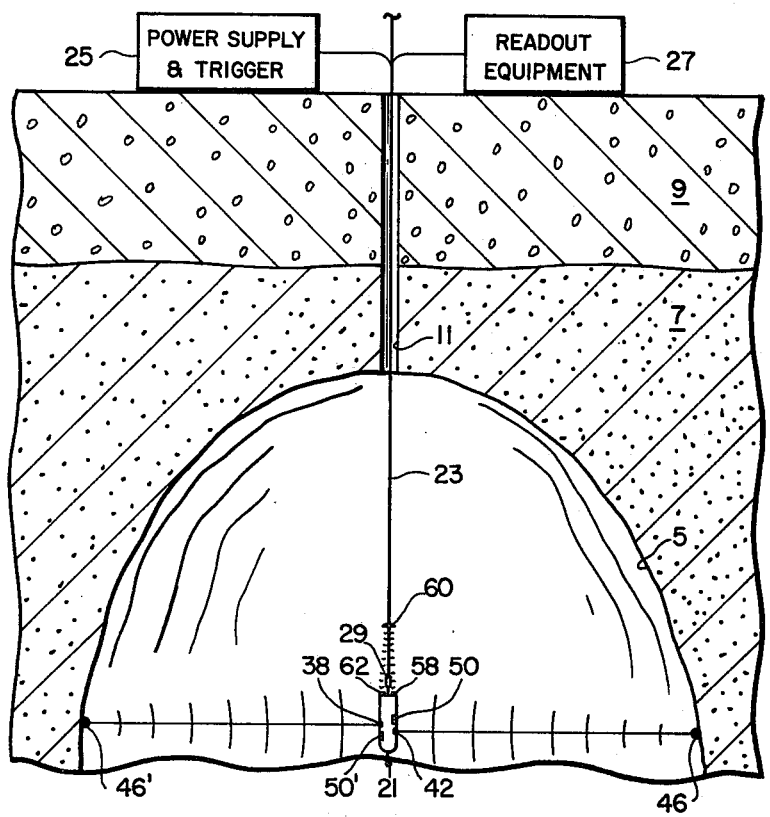
FIG_3
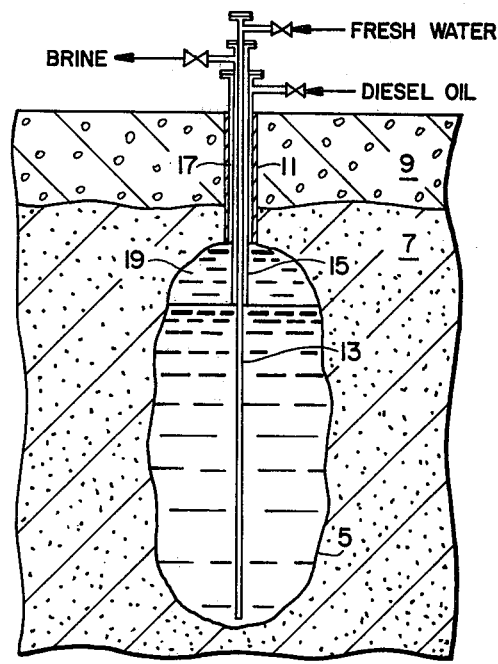
FIG_1
FIG_2

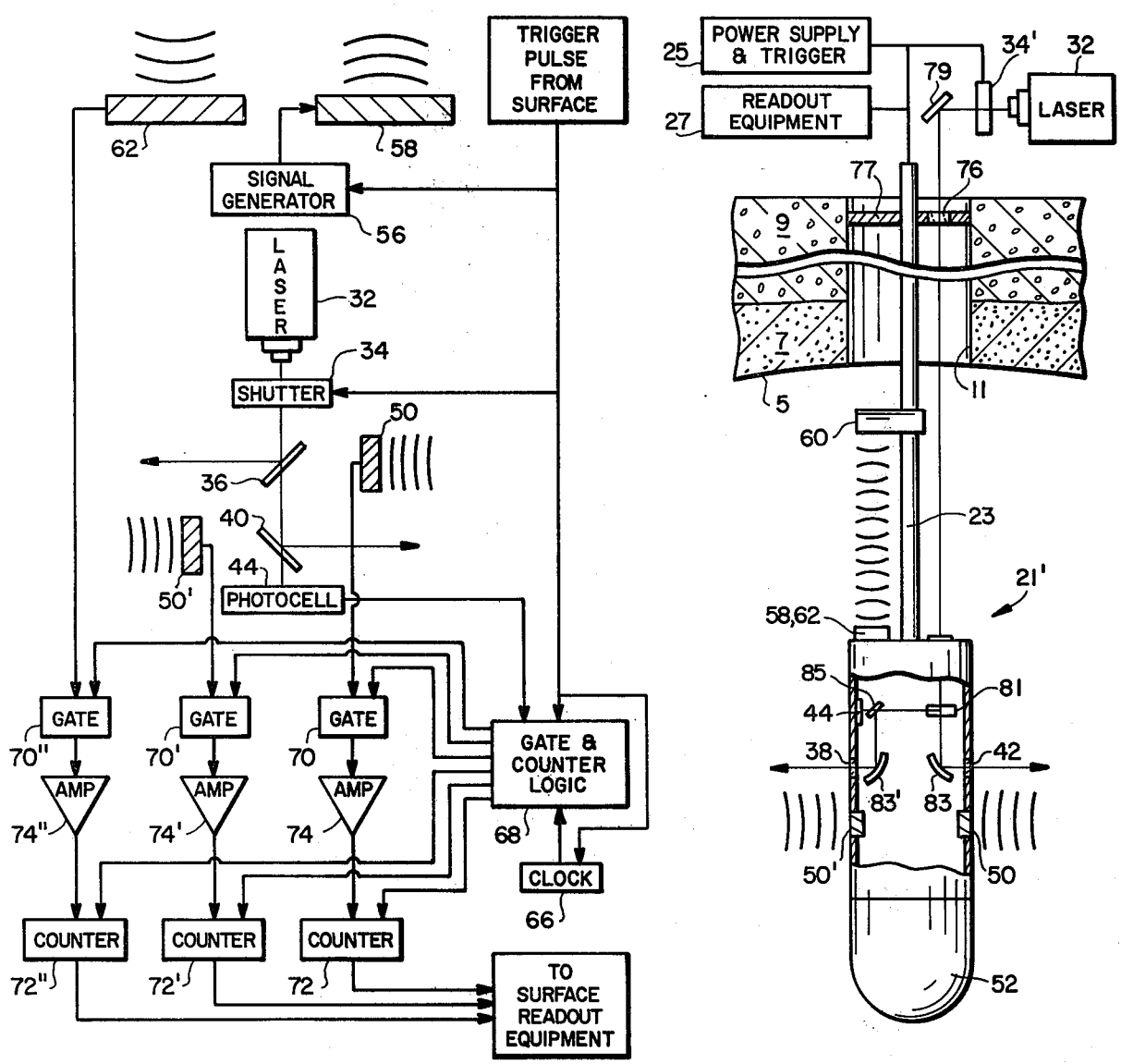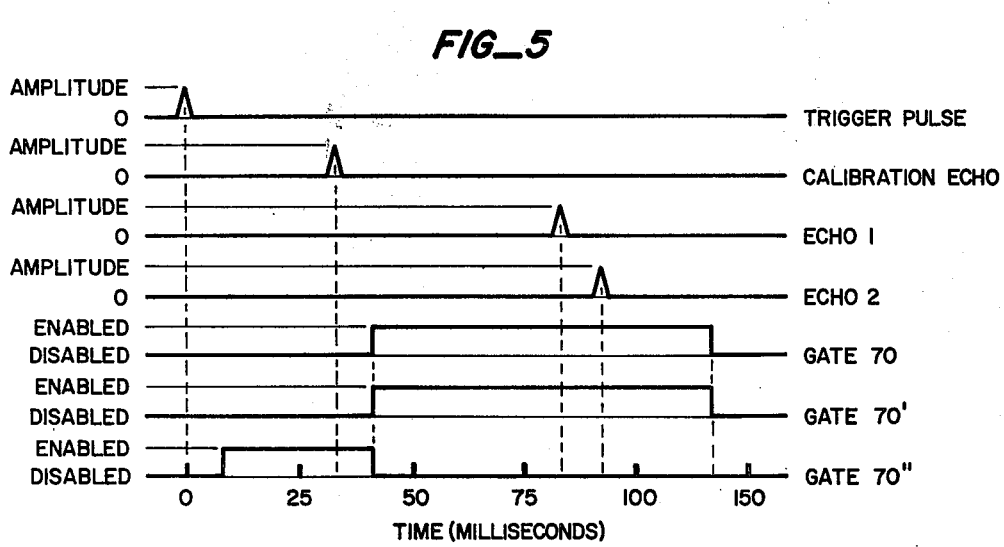

METHOD AND APPARATUS FOR MEASURING THE INTERIOR DIMENSIONS OF A HOLLOW BODY

BACKGROUND OF THE INVENTION

1. Field of the Invention

The present invention generally relates to devices for measuring the interior dimensions of hollow bodies and, in particular, for measuring bodies having a very restricted opening through which the measuring apparatus must pass.

2. Description of the Prior Art

Recently, there has been a substantial effort by both government and industry to develop underground salt deposits for various purposes. Salt deposits are being mined to provide long-term petroleum storage areas and disposal sites for radioactive waste. In addition, there has been extensive research into the use of salt caverns for storing compressed air as a means of energy storage. Electric power is used to compress and store air in these large caverns during periods of low energy demand. This compressed air is later used during periods of peak energy demand to drive turbines and electrical generators.

To form a large salt cavern, the salt is removed from an underground geological formation by solution-mining. A typical cavern being solution-minded is illustrated in FIG. 1. The cavern 5 is formed in a salt dome 7 which is covered by overburden and cap rock 9. The entire process is conducted through a small diameter, cased bore hole 11. Fresh water is injected through one of two concentric pipes 13, 15, called leaching strings, and the brine is extracted through the other pipe. The salt is dissolved near the point of injection of the fresh water. There is a third concentric pipe 17 called a blanket string which is used to inject a blanket material 19 that is less dense than water. The blanket stops the solutioning process above a certain height by pushing the level of water downward. Typically, either diesel oil or propane is used for the blanket material.

To mine a large cavern, the solutioning process may take several years. About ten times the volume of brine must be processed as the volume of the cavern. The extent of salt removal is controlled by monitoring the concentration of the brine that is removed. Periodically, the two leaching strings 13, 15 and the blanket string 17 are reset or the blanket pressure is changed in order to alter the shape of the area being excavated. At occasional intervals, the shape of the cavern is measured by retracting the three strings and lowering a measuring device into the cavern. In this manner, the diameter, depth, and wall uniformity are measured. When the desired shape of the cavern is obtained, the solution-mining process is stopped and water is pumped out.

A typical solution-mined salt cavern has a volume of about 6 million petroleum barrels, a diameter of about two hundred feet, and a height of approximately two thousand feet. The diameter of the bore hole is between ten and sixteen inches and is about one thousand feet in length. The bottom wall of the cavern is located at approximately three thousand feet below the surface.

At the present time the most common method for measuring the dimensions of a salt cavern is by sonar ranging with water propagated acoustic waves. This method is expensive and time consuming because it requires that the cavern be filled and emptied with water or brine. Typically, it takes several months to apply this method. In addition, an undesirable consequence of this technique is the further alteration of the cavern dimensions by additional solutionmining. The large liquid pressure load on the cavern walls also causes bulging. The diameter when measured with this technique is only an approximation of the diameter that exists when the cavern is filled with air. The hydrostatic pressure difference between the top and the bottom of a typical cavern filled with saturated brine is approximately twenty-eight atmospheres.

Another method of determining the dimensions of salt caverns is radar ranging in a pulse-echo mode using microwaves. Heretofore, these radar devices have been expensive and require an extensive amount of equipment that must be located on the surface. These systems are also not easily miniaturized for insertion through the long narrow bore hole.

Other prior methods have included the use of laser beams and air propagated acoustic waves. If a sufficiently powerful laser is used, the wall surfaces of the cavern reflect a measurable amount of light. However, in order to measure a variation in wall dimension of plus or minus one inch, the timing accuracy required for a laser beam is approximately $0.33 \times 10^{-9}$ seconds. Although an elapsed time of this magnitude can be measured in the laboratory, such timing is difficult to perform under the rugged conditions of a drilling site. The air-salt interface also has a low coefficient of reflection to wavelengths between 0.2 and 20$\mu$m. The use of air propagated acoustic waves has not been developed because of the problem of developing an acoustic transmitter that is sufficiently powerful to propagate waves across the cavern and yet small enough to fit into the bore hole. The use of air propagated acoustic waves is complicated by the increased attenuation of the waves as the wavelength is reduced to provide a measuring tolerance of one inch.

There is also a geometrical problem that occurs whether acoustic or electromagnetic waves are used. The walls of a salt cavern typically are mirror smooth. Because the walls are so smooth, both incident acoustic and electromagnetic waves are specularly reflected from the walls. When echo-ranging is performed, there is a high likelihood that the entire reflected beam will miss the receiver because the plane of the cavern wall is not orthogonal to the direction of propagation of the waves.

SUMMARY OF THE INVENTION

The primary object of the present invention is to overcome the limitations and disadvantages of the prior art.

An additional object of the present invention is to measure large interior dimensions within a hollow body having a very restricted entrance passage. In a salt cavern the ratio of the bore hole diameter to the cavern diameter is about 1:200.

A further object of the present invention is to measure the interior dimensions of the hollow body independently of the manner of energy reflection from the surface of the body and independently of the orthogonality of the reflecting surface.

Still another object of the present invention is to accurately measure the diameter of a large, underground cavern that is mined in a salt dome. A typical salt cavern has the following dimensions:

Diameter of the bore hole: 10-16 inches
Cavern diameter: 200 feet

Variation in cavern diameter: ±10 feet
Length of bore hole: 1,000 feet
Depth of cavern bottom wall from surface: 3,000 feet
Volume: 6 million petroleum barrels These and other objects are achieved by an apparatus for measuring the interior dimensions of the walls of a hollow body. The apparatus includes a means for transmitting a beam of electromagnetic energy toward a location on an interior wall of the hollow body. When illuminated by electromagnetic energy, the wall location radiates back acoustic waves with expanding spherical wavefronts. The acoustic waves are detected by the apparatus and the elapsed time between the transmission of the electromagnetic beam and the detection of the acoustic waves is measured so that the dimensions of the interior walls can be obtained.

Additional objects and features of the invention will appear from the following description in which the preferred embodiments have been set forth in detail in conjunction with the accompanying drawings.

BRIEF DESCRIPTION OF THE DRAWINGS

FIG. 1 is a side elevational view, not to scale, of a salt dome being solution-mined.

FIG. 2 is a side elevational view, partially cut away, of an apparatus for measuring the interior dimensions of a hollow body.

FIG. 3 is a side elevational view, partially cut away, of the apparatus of FIG. 2 operating within a large underground cavern in a salt dome.

FIG. 4 is a schematic diagram of the timing and logic circuit for the apparatus of FIG. 2.

FIG. 5 is a timing diagram for the circuit of FIG. 4.

FIG. 6 is a side elevational view, partially cut away, of an alternative embodiment of an apparatus for measuring the interior dimensions of a hollow body.

DESCRIPTION OF THE PREFERRED EMBODIMENTS

FIGS. 2 and 3 illustrate an apparatus for measuring the interior dimensions of the walls of a hollow body. The preferred embodiment has application primarily in the measurement of the interior dimensions of a large, underground cavern that has been solution-mined in a salt dome 7. The apparatus includes a transceiver 21 that is suspended in the cavern 5 from either a shaft 23 or a cable. The transceiver enters the cavern through a narrow bore hole 11 after the leaching strings 13, 15, FIG. 1, and the blanket string 17 have been removed. The transceiver can be remotely rotated in azimuth about a vertical axis by a servo-controlled rotor 29, FIG. 2. The rotor permits the apparatus to make a plurality of measurements in a horizontal plane within the cavern. The transceiver is powered and triggered by a power supply 25, FIG. 3, located on the surface near the drilling site. The measurements made by the transceiver are processed, stored, and displayed on the read-out equipment 27 also located on the surface near the drilling site. The power supply and the read-out equipment are connected to the transceiver by electrical cables that pass through the shaft 23.

The transceiver 21, FIG. 2, includes means for transmitting a beam of electromagnetic energy toward two locations 46, 46' on opposite interior walls of the cavern 5, FIG. 3. In the preferred embodiment the electromagnetic energy transmitting means includes a laser 32, a half-silvered mirror 36 and a mirror 40 that is almost totally reflecting. Mirror 40 transmits just enough light to actuate the photodetector 44 as described below. The laser is of conventional construction and transmits a high energy beam of coherent, collimated light. The laser is energized by the power supply 25, FIG. 3, and can be either pulsed or continuous. If a continuous type laser is used, the transmitted light beam is controlled by an electrically actuated shutter 34, FIG. 2. The shutter opens and shuts to control the duration of the light beam. If a pulsed laser is used, then a shutter may not be required.

One portion of the light from the laser 32, FIG. 2, is reflected in a horizontal direction out of an upper optical window 38 by an upper half-silvered mirror 36. As viewed in FIG. 2, this upper beam is propagated to the left. The remaining laser light passes vertically through the upper half-silvered mirror 36. Most of the remaining beam is thereafter partially reflected in a horizontal direction through a lower optical window 42 by a lower mirror 40. As illustrated in FIG. 2, this second horizontal beam of light is propagated to the right. The remaining light from the laser continues vertically downward and is incident on a photo-detector 44 of known construction. The photo-detector is used to activate the timing circuit described below and to indicate when the light beam is transmitted from the apparatus.

Referring to FIG. 3, the high energy pulses of collimated laser light propagated from each side of the transceiver 21 illuminate two small spots 46, 46' on opposite sides of the cavern 5. The electromagnetic energy is absorbed in the wall and produces highly localized heating. This heating generates pressure waves in the salt, and the pressure waves produce acoustic waves propagated in the air of the cavern. The acoustic waves appear to originate from the small area illuminated by the laser. The acoustic waves are propagated radially outward into the cavern with spherical wavefronts from the illumination spots 46, 46'. The laser light is collimated and focused to some extent to insure that the illumination spots are of small size. A small sized spot is desirable to insure that the electromagnetic heating is highly localized and to cause the source of acoustic waves to appear as a point source. A small sized spot insures that the acoustic waves diverge into the cavern with expanding spherical wavefronts and that some portion of the acoustic waves is detected by the transceiver 21.

The acoustic waves incident on the transceiver 21, FIG. 2, are detected with two flat, piezoelectric ceramic detectors 50, 50'. Each detector is oriented so that its axis of maximum sensitivity is substantially parallel to the axis of propagation of the laser beam. The acoustic waves detected by these detectors are coverted into electrical signals that are passed to an electronics compartment 52 in the lower portion of the transceiver. The electronics compartment is mounted on the end of the transceiver so that it does not interfere with either the laser beam or the sound waves and where it can act as a protective bumper for the apparatus.

Referring to FIG. 3, the transceiver 21 propagates and receives waves along two parallel and opposite directions in order to overcome the uncertainty in the precise location of the transceiver. It should be understood that the transceiver is lowered into the cavern 5 through a long bore hole that can be as long as 1,000 ft. in length. Thus, the position of the transceiver with respect to the central vertical axis of the cavern cannot be precisely determined. When the distance between two diametrically opposite locations is measured, the sum of these two readings is a dimension across the cavern and is independent of the precise location of the transceiver.

To calibrate the transceiver, the velocity of propagation of acoustic waves is measured. This velocity measurement is necessary because the cavern may have a depth on the order of 3,000 ft. along which the measurements are spaced. The cavern can also be subjected to air pressure during operation of between 40–80 atmospheres. The velocity of sound in the cavern is measured by timing the transit of acoustic waves along a path of known length. The apparatus includes a signal generator 56, FIG. 2, that powers a transmitting transducer 58 located on the upper portion of the transceiver 21. The transmitting transducer radiates acoustic waves having substantially the same wavelengths as the waves radiated from the illumination spots 46, 46′, FIG. 3. The acoustic waves from the transmitting transducer are reflected by an acoustic reflector 60 mounted on the suspending shaft 23 above the transceiver. The reflector reflects the acoustic waves back to the transceiver, and the return echo is detected by a receiving transducer 62. Since the length of the path between the transducers and the reflector is known and the wavelength corresponds to the waves from the illumination spots, the elapsed time for the acoustic waves to propagate along this path can be converted into the velocity of the acoustic waves received from the illumination spots 46, 46′, FIG. 3.

In an alternative embodiment the calibration apparatus uses a transmitted laser pulse which is incident on a target-transmitter (not shown). The target-transmitter sends back an acoustic pulse along a path of known length.

The transceiver 21 measures the elapsed time between transmission of the electromagnetic energy and reception of the acoustic waves with the timing and logic circuit illustrated in FIG. 4. This circuit is located within the electronics compartment 52, FIG. 2. The circuit includes a master clock 66 that provides timing pulses of constant frequency. The output of the clock is passed to a gate and counter logic circuit 68. This circuit enables the gates 70, 70′, 70″. When enabled the gates 70, 70′ pass the electrical signals from the acoustic transducers 50, 50′ indicating the incidence of the acoustic waves from the walls of the cavern. The outputs of the gates 70–70 ″ are individually amplified by the signal amplifiers 74, 74′, 74″.

In operation the transceiver measures the elapsed time between transmission of a pulse of electromagnetic energy and reception of acoustic waves from the walls of the cavern. If the measurement is made during solution-mining, the leaching strings 13, 15, FIG. 1, and the blanket string 17 are first removed. The transceiver is thereafter passed down through the bore hole 11, FIG. 3, into the cavern. The transceiver is rotated in azimuth to selected positions by the remote servo-controlled rotor 29, FIG. 2.

To make a measurement, the laser is energized by the power supply 25, FIG. 3, located on the surface. The power supply 25 also generates a trigger pulse, FIG. 5, that causes the formation of a laser light pulse of known duration. If the laser 32 is of the continuous type, the trigger pulse opens and shuts the shutter 34. If the laser is of the pulse type, the trigger pulse causes the emission of a pulse of light from the laser. Timing is commenced when the laser beam is incident on the photocell 44, FIG. 4. The photocell triggers the gate and counter logic circuit 68, FIG. 4. This circuit enables the gates 70, 70′, and 70″, as indicated in FIG. 5, and commences sending clocking pulses to the counters 72, 72′, and 72″.

When the shutter 34, FIG. 4, opens or a pulse of light is emitted by the laser 32, two beams of light are reflected by the half-silvered mirrors 36, 40 in parallel and in opposite directions across the cavern 5. The laser beams are incident on the two illumination spots 46, 46′, FIG. 3. The electromagnetic energy is collimated and focused to some degree so that a substantial amount of electromagnetic energy is centered in a very small area. This energy is absorbed in the wall and produces highly localized heating. The heating causes the development of pressure waves in the salt, and the pressure waves in turn produce acoustic waves that propagate back toward the transceiver 21. The acoustic waves appear to originate from a point source that corresponds to the area of the illumination spot. The acoustic waves diverge outward from the illumination spots and have spherical wavefronts.

The acoustic waves are detected by the transceiver 21, FIG. 2, using the acoustic transducers 50, 50′. The transducers convert the incident acoustic waves into electrical signals, echo 1 and echo 2, FIG. 5, that are passed through the gates 70, 70′ and amplified by the amplifiers 74, 74′. The signals from the transducers cause the counters 72, 72′ to stop counting the clocking pulses received from the master clock 66. These clocking pulses are passed from the clock through the gate and counter logic circuit 68. The elapsed time between transmission of the electromagnetic energy and the reception of the acoustic waves from each illumination spot corresponds to the number of counting pulses recorded by the two counters. This information is passed to the read-out equipment 27, FIG. 3, located on the surface and is converted into a dimensioned measurement.

The trigger pulse from the power supply 25, FIG. 3, also actuates a propagation velocity calibration circuit. The trigger pulse actuates the signal generator 56 that in turn powers the transmitting transducer 58, FIG. 4. The transmitting transducer radiates an acoustic beam that is reflected by the reflector 60, FIG. 2. The reflected acoustic beam is detected by the receiving transducer 62. The signal from the receiving transducer is passed to a gate 70″ and is amplified in the signal amplifier 74″. The signal from the receiving transducer stops the counter 72″ which heretofore was receiving clocking pulses from the gate and counter logic circuit 68. The number of pulses recorded by the counter 72″ is related to the velocity of propagation of the acoustic waves detected by the transceiver. The number of pulses recorded=2df/v, where d is distance of calibration reflector, f is clock or pulse frequency, and v is velocity of propagation. The output of the counter 72″ is also passed to the read-out equipment 27 located on the surface.

Referring to FIG. 5, the trigger pulse from the power supply 25 causes the gate and counter logic circuit 68 to enable gate 70″ first. This gate, when enabled, passes the calibration echo that stops the counter 72″. Next, gate 70″ is disabled and gates 70, 70′ are enabled to pass the two echoes from the two illumination spots 46, 46′. These echoes are converted by the transducers 50, 50′ into electrical signals that stop the counters 72, 72′, respectively. The three counters 72, 72′, and 72″ commence counting when the light from the laser is incident on the photocell 44. The photocell triggers the gate and counter logic circuit 68. The gates 70, 70', and 70" are enabled and disabled, as illustrated in FIG. 5, in order to insure that the acoustic waves detected by the various transducers are in fact the waves desired to be measured. It should be understood that a salt cavern such as the one illustrated in FIG. 1, produces a substantial number of reverberations, harmonics, and refelected acoustic waves.

It should also be appreciated that the elapsed time between transmission of the laser pulse and detection of the acoustic waves corresponds very closely to the one-way transit between the wall of the cavern and the transceiver made by the acoustic waves. This is because the transit time of the light across the cavern is negligible compared to the transit time of the acoustic waves in air.

FIG. 6 illustrates an alternative embodiment of the present invention wherein the laser 32 and the shutter 34'are positioned on the surface and the light from the laser is propagated down the bore hole 11. This embodiment can be used when a high powered laser is required and is too bulky to be inserted into the bore hole. This embodiment is also used when the cavern 5 is under pressure and sealed from the atmosphere. The light from the laser is passed through an optical window 76 in the seal 77.

The apparatus of FIG. 6 operates in substantially the same manner as the embodiment described above and like numbers identify like parts. The light from the laser 32 is controlled by the electrically actuated shutter 34' that is triggered by the power supply 25. The beam is reflected by a mirror 79 down into the bore hole 11. If the cavern is sealed from the atmosphere by the seal 77, the beam is passed through an optical window 76 in the seal. The beam is incident on the transceiver 21' and inside is evenly split by a beam splitter 81 of known construction. One portion of the beam is incident on a focusing mirror 83 that directs the beam horizontally outward through the optical window 42. A focusing mirror is used in order to concentrate the light to a small spot on the cavern wall after its long passage down the bore hole 11. The other portion of the beam is again split by an almost totally reflecting mirror 85. The major portion of this beam is directed vertically downward to a second focusing mirror 83' which reflects the beam outward through the optical window 38. The other smaller portion of the beam passes through the mirror 85 and is incident on the photo-detector 44. The photo-detector 44 operates in the same manner as the photo-detector illustrated in FIG. 2 and described below. The two beams of electromagnetic energy are incident on the cavern walls and generate acoustic waves that are detected and measured in the same manner as described above.

The transceiver 21', FIG. 6, also has a similar echo calibration apparatus for measuring the velocity of acoustic waves. This apparatus uses the transducers 58, 62, FIG. 6, and operates in the same manner as described above. In addition, the transceiver 21' uses essentially the same electrical circuit and timing diagram illustrated in FIGS. 4 and 5.

It should be appreciated that the present invention contemplates inter alia making range and dimension measurements by generating acoustic waves in air by the absorption of laser energy in the object being measured. Heretofore, in pulse-echo ranging both acoustic waves and electromagnetic radiation had the problem of specular reflection. If the aspect of the reflecting surface of the object being measured was not orthogonal to the axis of propagation of the energy, the reflected specular waves were directed away from the receiver and the echo was either very weak or not received at all. The present invention overcomes this problem by radiating acoustic waves that diverge outward with spherical wavefronts from the object being measured. The propagation of these spherical wavefronts is independent of the aspect of the object being measured and the roughness of its surface.

Thus, although the best mode contemplated for carrying out the present invention has been herein shown and described, it will be apparent that modification and variation may be made without departing from what is regarded as the subject matter of the invention.

What is claimed is:

1. An apparatus for measuring the interior dimensions of the walls of a hollow body, said walls radiate acoustic waves when illuminated by electromagnetic energy, comprising:
    (a) means for transmitting a beam of electromagnetic energy toward a location on an interior wall of a hollow body;
    (b) means for receiving acoustic waves propagated from said wall location in response to the electromagnetic energy; and
    (c) timing means for determining the elapsed time between transmission of the electromagnetic energy and reception of the acoustic waves so that a measurement of the dimension between the apparatus and the wall location is obtained.

2. An apparatus as in claim 1 in which the electromagnetic transmitting means is a laser adapted for transmitting a beam of coherent collimated light toward the wall location.

3. An apparatus as in claim 1 including means for measuring the velocity of acoustic waves propagated within the hollow body.

4. An apparatus as in claim 1 in which the electromagnetic transmitting means is adapted for radiating two parallel beams of electromagnetic energy in opposite directions toward two locations on opposite interior walls of the hollow body and in which the acoustic wave receiving means is adapted for receiving acoustic waves propagated from said wall locations.

5. An apparatus as in claim 1 including means for lowering said transmitting means, receiving means, and timing means into a bore hole.

6. An apparatus as in claim 1 including means for azimuthally rotating the transmitting means and receiving means within the hollow body.

7. An apparatus for measuring the interior dimensions of the walls of the hollow body, said walls radiate acoustic waves when illuminated by electromagnetic energy, comprising:
    (a) an elongate, narrow housing adapted for passage through a restricted opening in a hollow body;
    (b) means for transmitting a beam of electromagnetic energy from the housing toward a location on an interior wall of the hollow body;
    (c) means for detecting acoustic waves incident on the housing, said waves being propagated from said wall location in response to the electromagnetic energy; and
    (d) timing means within the housing for determining the elapsed time between transmission of the electromagnetic energy and detection of the acoustic waves so that a measurement of the dimension between the apparatus and the wall location is obtained.

8. An apparatus as in claim 7 in which the electromagnetic transmitting means is a laser adapted for transmitting a beam of coherent collimated light, said laser being located within the housing and adapted for passage through a restricted opening.

9. An apparatus as in claim 7 including means for lowering the housing, transmitting means, detecting means, and timing means into a bore hole and means outside of the hollow body for actuating the apparatus and recording the measurement.

10. An apparatus for measuring the interior dimensions of the walls of the hollow body, said walls radiate acoustic waves when illuminated by electromagnetic energy, comprising:
  (a) an elongate, narrow housing adapted for passage through a restricted opening in a hollow body;
  (b) means for transmitting a beam of electromagnetic energy toward the housing from outside of the hollow body;
  (c) means in the housing for directing the beam of electromagnetic energy from the transmitting means toward a location on an interior wall of the hollow body;
  (d) means for detecting acoustic waves incident on the housing, said waves being propagated from said wall location in response to the electromagnetic energy; and
  (e) timing means within the housing for determining the elapsed time between transmission of the electromagnetic energy and detection of the acoustic waves so that a measurement of the dimension between the apparatus and the wall location is obtained.

11. An apparatus as in claim 10 in which the electromagnetic transmitting means is a laser adapted for transmitting a beam of coherent collimated light.

12. An apparatus as in claim 10 including means for lowering the housing, the beam directing means, detecting means, and timing means into a bore hole and means outside of the hollow body for actuating the apparatus and recording the measurement.

13. A method for measuring the interior dimensions of the walls of a hollow body, comprising the steps of:
  (a) transmitting a beam of electromagnetic energy toward a location on an interior wall of a hollow body;
  (b) detecting acoustic waves radiated from the wall location in response to the electromagnetic energy; and
  (c) measuring the elapsed time between transmission of the electromagnetic energy and detection of the acoustic waves.

14. A method as in claim 13 in which the step of transmitting includes transmitting a pulse of high energy, coherent, collimated light.

15. A method as in claim 13 including measuring the velocity of acoustic waves propagated within the hollow body.